H. L. TANNER.
DAMPING MEANS FOR GYROSCOPES.
APPLICATION FILED DEC. 4, 1919.
1,405,807.
Patented Feb. 7, 1922.
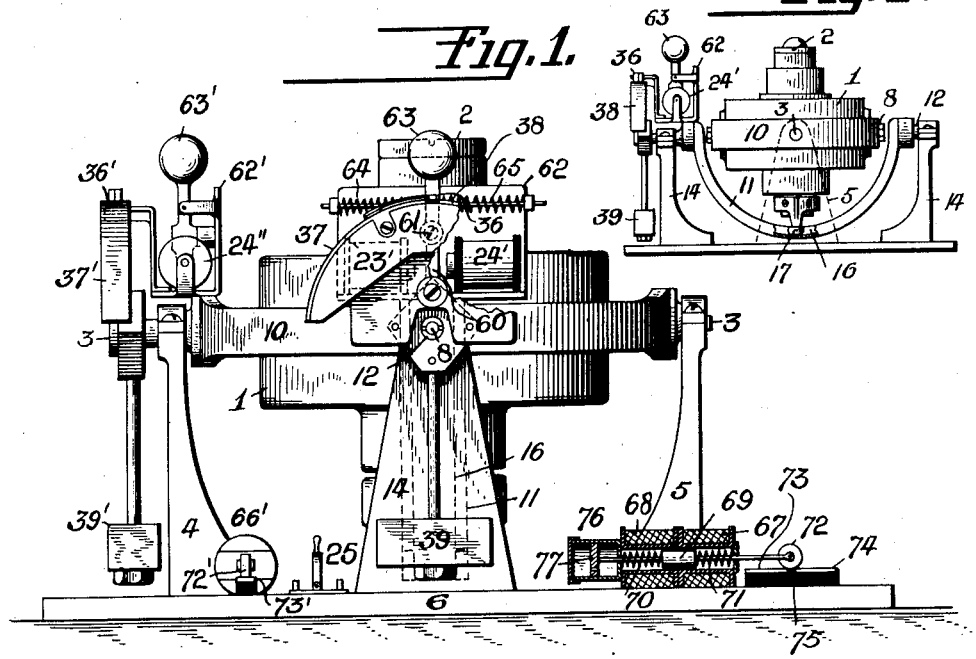
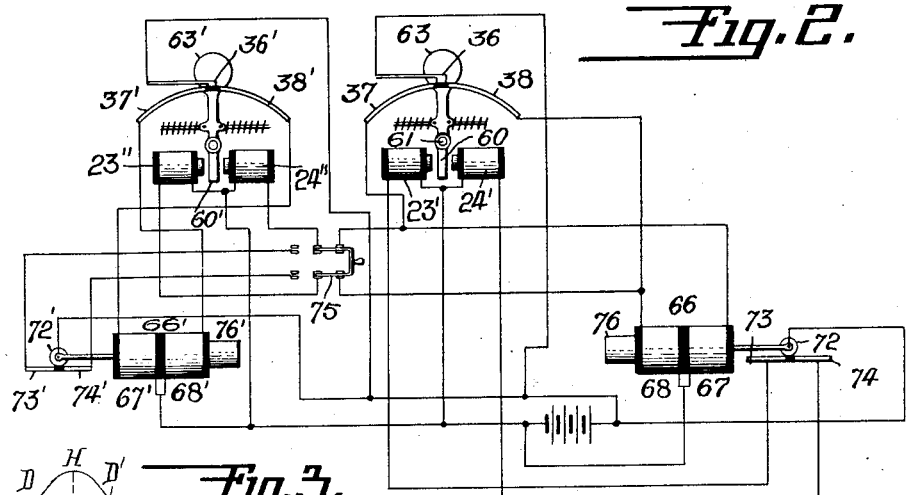
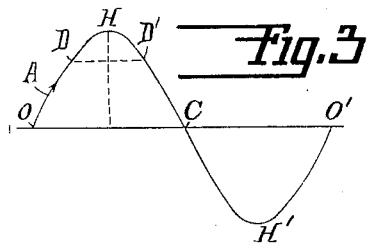
INVENTOR
HARRY L. TANNER.
BY
Herbert H. Thompson
HIS ATTORNEY

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

DAMPING MEANS FOR GYROSCOPES.

1,405,807.     Specification of Letters Patent.     Patented Feb. 7, 1922.

Original application filed June 8, 1917, Serial No. 173,557. Divided and this application filed December 4, 1919. Serial No. 342,460.

*To all whom it may concern:*

Be it known that I, HARRY L. TANNER, a citizen of the United States of America, residing at 1144 East 19th Street, Brooklyn, New York, in the county of Kings and State of New York, have invented certain new and useful Improvements in Damping Means for Gyroscopes, of which the following is a specification.

This invention relates to damping and controlling means for gyroscopic apparatus. Although shown as applied to a gyroscopic pendulum the methods of damping and controlling outlined herein are equally applicable to other types of gyroscopes such as the gyroscopic compass, etc., since, broadly speaking, all forms of gyroscopic apparatus are gyro pendulums.

More particularly this application is a division of my prior application for Letters Patent of the United States, Serial No. 173,557, for "damping means for gyroscopic pendulums," filed June 8, 1917, which has now matured into Patent No. 1,324,478, granted December 9, 1919. In all types of gyroscopes where they are supported for oscillation about at least one horizontal axis it has been found not only desirable but necessary to provide some form of damping means if the gyroscope is to be successful for the purpose for which it is designed. The methods herein outlined also have a broader application than for damping only as will be apparent as the description proceeds.

Referring to the drawings in which what I now consider to be the preferred form of my invention is shown:

Fig. 1 is a side elevation of a gyroscopic pendulum with the damping means applied thereto.

Fig. 2 is a wiring diagram showing how the damper is controlled.

Fig. 3 is a diagram representing a complete oscillation of the pendulum showing the points at which the damping means are applied.

Fig. 4 is a diagrammatic side elevation on a reduced scale showing the swing loop.

The gyroscope proper may comprise a rotor casing 1 within which the rotor (not shown) is journalled on a vertical spinning axis 2, said casing being pivotally mounted on axis 8 within gimbal ring 10, said ring being in turn supported on a horizontal axis 3—3 in brackets 4—5 on base plate 6. The gyroscope is centralized by the yielding force of gravity about both horizontal axes. The mount just described is merely illustrative and may be varied in accordance with the purposes for which the gyroscope is designed. A swinging loop or bail 11 is pivoted about axis 12 in brackets 14, preferably normally in line with axis 8. Said loop may be made with a depression or track 16 in which a projection 17 on the gyro casing engages.

In order to damp the oscillations of the gyroscope I provide means for causing the gyroscope to do work as it oscillates. In the form shown this may be accomplished by applying a torque on the gyroscope which is out of phase for a period of oscillation so that the oscillation works against such torque for the major portion of the period. Preferably the same source of torque is made use of for this purpose as is used to control the pendulum, e. g. gravity, the action or strength of the torque being altered for different phases of an oscillation so that said torque is greater when opposing an oscillation than when accelerating.

My preferred method of applying such a torque is to shift the relative position of the center of gravity of the gyroscope and the axis of support so that as the gyroscope precesses or oscillates the center of gravity will be shifted in the opposite direction to cause the action of gravity to oppose said precession. One method of causing such shift in the center of gravity is to mount a mass which is movable laterally with respect to the gyroscope so as to cause gravitational torque to be applied thereon upon inclination of the gyroscope. The movement of such mass about a given horizontal axis may be controlled by inclination of the gyroscope about the same axis, if desired. In such case, however, unless means are provided to cause movement of the mass to be out of phase with the oscillation of the gyroscope such movement would not damp the oscillation of the gyroscope but would merely impart or effect the pendulosity of the same.

In order to control the application of the damping means, I prefer to employ contacts or the like brought into operation by the inclination of the gyroscope about one or the other of the horizontal axes. It is important for my purposes, however, that the center of gravity be shifted in such direction and that such a time as will cause the existing oscillatory movement to be opposed by gravity, while avoiding accelerating the oscillation by gravity during another phase of the oscillation. I have found that to secure the maximum damping effect, the force of gravity should be brought into operation approximately one quarter of a period of oscillation after the said oscillation, or in other words, it should lag a quarter phase behind the oscillatory movement. One method of accomplishing this result is by employing contacts about the axis on which the damping means is placed and inserting between said contacts and the damping means a time lag device.

For controlling the damping means I may secure to the loop 11 a contact 36 adapted to cooperate with independently mounted contact sectors 37 and 38 so as to excite one or the other of electromagnets 23′ or 24′ depending on the position of the brush 36 (see Fig. 1). I prefer to mount the contacts 37 and 38 on an independently mounted pendulum or pendulous device 39 pivoted about an axis substantially in line with or parallel to axis 12. Said electromagnets 23′ and 24′ are mounted preferably on the loop 11. An armature 60 is pivoted at 61 on a bracket 62 on said loop so as to be attracted by either of said magnets, and carries a ball or other mass 63 adjacent its outer end. The armature is normally held vertical by centralizing springs 64, 65 but excitation of one or the other of magnets 23′ or 24′ will throw it to the right or left and hence shift the center of gravity of the system. In order to introduce the proper time lag between the contacts and the magnets, I may employ a solenoid 66 having a pair of windings 67 and 68 in circuit respectively with contacts 37 and 38. The movable core 69 of said solenoid is normally held midway between said windings by springs 70 and 71. Said core has secured thereto a brush or trolley 72 adapted to contact with strips 73 and 74 spaced by a block of insulation 75. A dash pot 76 or other retarding device is also provided, the piston 77 thereof being secured to said core. Contacts 73 and 74 are placed in circuit with magnets 23′ and 24′ respectively. The dash pot is preferably so designed that trolley 72 does not contact with strip 73, for instance, until approximately a quarter of a period after contact of 36 with 38 so that the center of gravity will not be shifted until the gyroscope reaches its extreme position of elevation. A similar damping system is also shown about axis 3—3 comprising pendulum 39′, contacts 36′, 37′, and 38′, magnets 23″ and 24″, inverted pendulum 63′, solenoid 66′, and contacts 72′, 73′, and 74′. In this connection I may provide means whereby pendulum 39′ and its associated contacts and solenoid may be eliminated and magnets 23″ and 24″ controlled directly from the contacts 36, 37, and 38, the characteristics of the gyro-pendulum being relied upon to impart the necessary time lag without the use of a dashpot. A double throw switch 85 readily accomplishes this purpose, as shown in Fig. 2. The characteristic of the gyro-pendulum to which I refer is the oscillating of said gyro-pendulum at its maximum speed about one horizontal axis while passing slowly through its maximum inclination about the other axis, one oscillating movement being a quarter phase behind the corresponding movement about the other axis. When the switch 85 is in its position shown in Fig. 2 the magnets 23″ and 24″ are brought into action by inclination of the gyroscope about axis 12 with the result that the weight 63′ is shifted to damp the oscillations of the gyroscope about the axis 3—3.

The operation of this modification will be readily understood by reference to curve A of Fig. 3. Contact will be made between brush 36 and sector 37 as soon as point O is passed through. The damping means will not be brought into operation, however, until the point H is reached, which is a quarter period behind point O. Upon being placed in operation, the damping means will remain effective, until point H′ is reached, even though point C is passed through, due to the action of the dashpot. At or near point H′, however, the actual damping means will be reversed due to the continued contact of brush 36 with sector 38 so that the oscillation of the pendulum on rising will be opposed throughout the period of rise.

It will, of course, be understood that the application of the damping means need not be spaced exactly a quarter phase behind the oscillation to be suppressed since other relationships will produce damping. It is to be noted, however, that if another relation of the parts is employed, say for instance, if the damping means is brought into operation an eighth of a period behind the oscillation to be suppressed, that said damping means will be effective approximately only one half the time, since during the other half whatever damping effect could be obtained when the oscillation was in one direction would be nullified when the gyroscope reversed its direction of oscillation. Thus, in Fig. 3, if damping means are brought into operation at point D, instead of at point H, so as to oppose the downward oscillation of gyro, whatever damping could be secured between point H and point D′ would be substantially offset by acceleration of the oscillation between points D and H, point D′ being in line with point D.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a gyroscope, of means for damping the oscillations thereof about a horizontal axis, and means responsive to inclination of the gyroscope about said axis for causing operation of said damping means out of phase with said inclination.

2. The combination with a gyroscope mounted for oscillation about a horizontal axis, of a mass movable laterally with respect to said gyroscope so as to cause a gravitational torque to be applied thereon upon inclination of the gyroscope about said axis and governing means for effecting movements of said mass out of phase with the oscillations of said gyroscope about said axis.

3. The combination with a gyroscope mounted for oscillation about a horizontal axis, of a mass movable laterally with respect to said gyroscope so as to cause a gravitational torque to be applied thereon, means for moving such mass upon inclination of the gyroscope about said axis, and a time-lag device for retarding the action of the last named means.

4. The combination with a gyroscope mounted for oscillation about a horizontal axis, an auxiliary pendulum mounted for oscillation about the same axis, and means brought into operation by relative inclination of said gyroscope and pendulum for causing a torque to be applied about said axis.

5. The combination with a gyroscope mounted for oscillation about a horizontal axis, an auxiliary pendulum mounted for oscillation about the same axis, a mass laterally movable with respect to said gyroscope, and means responsive to relative inclination of said gyroscope and pendulum for so moving said mass.

6. The combination with a gyroscope mounted for oscillation about a horizontal axis, an auxiliary pendulum mounted for oscillation about the same axis, a mass laterally movable with respect to said gyroscope, and means responsive to relative inclination of said gyroscope and pendulum for moving said mass out of phase with said inclination.

7. The combination with a gyroscope, of means for damping the oscillations thereof about a horizontal axis, means responsive to inclination of the gyroscope about said axis for causing operation of said damping means, and retarding means acting between said two other means.

8. The combination with a gyroscope mounted for oscillation about a horizontal axis, of a mass movable laterally with respect to said gyroscope so as to cause a gravitational torque to be applied thereon, electromagnetic means for so moving said mass and means for governing said electromagnetic means to move said mass out of phase with the oscillations of the gyroscope about said axis.

9. The combination with a gyroscope mounted for oscillation about a horizontal axis, of means brought into action by inclination of said gyroscope about said axis for opposing the oscillations of said gyroscope about said axis both toward and away from its central position.

10. The combination with a gyroscope mounted for oscillation about a horizontal axis, of means brought into action by inclination of said gyroscope about said axis for opposing oscillations of said gyroscope about said axis in one direction without accelerating movement of the gyroscope when the latter swings in the opposite direction.

11. The combination with a gyroscope mounted for oscillation about a horizontal axis, of a mass movable laterally with respect to the gyroscope to cause a torque to be applied thereon about said axis, and means for moving said mass out of phase with the oscillations of the gyroscope about said axis.

12. The combination with a gyroscope mounted for oscillation about a horizontal axis, of a mass movable laterally with respect to the gyroscope to cause a torque to be applied thereon about said axis, and means for shifting said mass whenever said gyroscope reaches its limit of oscillation in either direction about said axis.

13. The combination with a gyroscope mounted for oscillation about a horizontal axis, of means for shifting the relative position of the centers of gravity and support of said gyroscope, for damping the oscillations thereof, and means responsive to inclination of said gyroscope about said axis for actuating said shifting means out of phase with the oscillations of the gyroscope about said axis.

In testimony whereof I have affixed my signature.

HARRY L. TANNER.